United States Patent
Billiet et al.

(10) Patent No.: US 11,612,856 B2
(45) Date of Patent: Mar. 28, 2023

(54) GAS TREATMENT ELEMENT AND A METHOD OF FORMING A GAS TREATMENT ELEMENT

(71) Applicant: Air Purification Skroll Ltd, Gateshead (GB)

(72) Inventors: Colin Billiet, Tyne and Wear (GB); James Holcroft, Gateshead (GB)

(73) Assignee: Air Purification Skroll LTD

( * ) Notice: Subject to any disclaimer, the term of this patent is extended or adjusted under 35 U.S.C. 154(b) by 811 days.

(21) Appl. No.: 16/304,326

(22) PCT Filed: May 24, 2017

(86) PCT No.: PCT/GB2017/051463
§ 371 (c)(1),
(2) Date: Nov. 26, 2018

(87) PCT Pub. No.: WO2017/203252
PCT Pub. Date: Nov. 30, 2017

(65) Prior Publication Data
US 2019/0134558 A1     May 9, 2019

(30) Foreign Application Priority Data
May 24, 2016   (GB) ...................... 1609108

(51) Int. Cl.
*B01D 53/02*     (2006.01)
*B01D 53/26*     (2006.01)
(Continued)

(52) U.S. Cl.
CPC ....... *B01D 53/261* (2013.01); *B01D 53/0431* (2013.01); *B01D 53/28* (2013.01);
(Continued)

(58) Field of Classification Search
CPC .......... B01D 2253/108; B01D 2253/25; B01D 2253/34; B01D 2253/3425;
(Continued)

(56) References Cited

U.S. PATENT DOCUMENTS

| | | |
|---|---|---|
| 3,876,738 A | 4/1975 | Marinaccio et al. |
| 4,911,775 A | 3/1990 | Kuma et al. |

(Continued)

FOREIGN PATENT DOCUMENTS

| | | |
|---|---|---|
| CN | 102160967 A | 8/2011 |
| EP | 2561917 | 2/2013 |

(Continued)

OTHER PUBLICATIONS

Search Report for corresponding GB Application No. 1609108.4 dated Feb. 19, 2017. GB.

(Continued)

*Primary Examiner* — Christopher P Jones
(74) *Attorney, Agent, or Firm* — The Belles Group, P.C.

(57) ABSTRACT

A method of forming a gas treatment element for use in a gas treatment apparatus, such as a desiccant dryer, is disclosed. The element is formed by casting a sheet material by phase inversion of a dope mixture including a solvent, an adsorbent material such as a desiccant and a polymer binder. Layers of the sheet material are located adjacent one another and this is most readily achieved by rolling the sheet material to form the gas treatment element.

8 Claims, 8 Drawing Sheets

(51) Int. Cl.
*B01D 53/28* (2006.01)
*B01J 20/30* (2006.01)
*B01J 20/28* (2006.01)
*B01D 53/04* (2006.01)
*B01J 20/16* (2006.01)

(52) U.S. Cl.
CPC ......... *B01J 20/165* (2013.01); *B01J 20/2804* (2013.01); *B01J 20/305* (2013.01); *B01J 20/3042* (2013.01); *B01D 2253/108* (2013.01); *B01D 2253/25* (2013.01); *B01D 2253/34* (2013.01); *B01D 2257/80* (2013.01)

(58) Field of Classification Search
CPC ............ B01D 2257/80; B01D 53/0431; B01D 53/261; B01D 53/28; B01J 20/165; B01J 20/2804; B01J 20/3042; B01J 20/305
See application file for complete search history.

(56) References Cited

U.S. PATENT DOCUMENTS

| | | | |
|---|---|---|---|
| 5,071,610 A | 12/1991 | Hagen et al. | |
| 5,120,331 A | 6/1992 | Landy | |
| 6,176,897 B1* | 1/2001 | Keefer | B01D 53/0476 95/98 |
| 7,077,891 B2 | 7/2006 | Jaffe et al. | |
| 2005/0211099 A1 | 9/2005 | Doughty et al. | |
| 2009/0126898 A1* | 5/2009 | Eplee | D21H 13/16 165/10 |
| 2010/0005968 A1 | 1/2010 | Endo et al. | |
| 2010/0133190 A1* | 6/2010 | Liu | B01D 53/228 210/650 |
| 2010/0263533 A1 | 10/2010 | Gadkaree et al. | |
| 2010/0288701 A1* | 11/2010 | Zhou | B01D 71/62 210/641 |
| 2010/0316846 A1* | 12/2010 | DeJong | B32B 27/306 428/172 |
| 2011/0056879 A1 | 3/2011 | Jacobs et al. | |
| 2013/0276634 A1* | 10/2013 | McKenna | B01J 20/28042 96/153 |

FOREIGN PATENT DOCUMENTS

| | | |
|---|---|---|
| JP | H01111422 | 4/1989 |
| WO | WO02/45847 A2 | 6/2002 |
| WO | WO2009/067625 A1 | 5/2009 |

OTHER PUBLICATIONS

International Search Report for corresponding Application No. PCT/GB2017/051463 dated Sep. 22, 2017. WO.

I.M Wienk et al., Recent Advances in the Formation of Phase Inversion Membranes Made from Amorphous or Semi-Crystalline Polymers; Journal of Membrane Science 113 (1996), University of Twente, Netherlands; pp. 1-11., Retrieved Jun. 24, 2021.

https://ww.solvay.comsites/g/files/srpend221/files/2018-08/Membranes-Processing-Guide_EN-v.4.6_0.pdf; Processing Guide for Polymer Membranes, 2014 Solvay Specialty Polymers, pp. 1-12., Retrieved Jun. 24. 2021.

M. Mulder., Phase Inversion Membranes., III/ Membrane Preperation/ Phase Inversion Membranes, Copyright 2000 Aceademic Press., pp. 1-1., Retrieved Jun. 24. 2021.

Synder Filtration, Definition of Phase Inversion Membrane, 2016. Note the Webarchive capture link establishes a latest date of publication of Apr. 30, 2016., https://web.archive.org/web/20160430072522/https://synderfiltration.com/lea rningcenter/articles/introduction-to-membranes/phase-inversion-membranes-immersionorecioitation/. Retrieved Apr. 13, 2022 pp. 1-2.

Boor Singn Lalia, Victor Kochkodan, Raed Hashaikeh, Nidal Hilal, A review on membrane fabrication: structure, properties and performance relationship, Desalination, vol. 326, 2013, pp. 77-95, ISSN 0011-9164, https://doi.org/10.1016/j.desal.2013.06.016 https://www.academia.edu/21128677A_review_on_membrane_fabrication_Structure_properties_and_performance_relationship?sm=b., Retrieved Jul. 25, 2022.

Hotda, A.K., & Vankelecom, I.F. (2015). Understanding and guiding the phase inversion process for synthesis of solvent resistant nanofiltration membranes. Journal of Applied Polymer Science, 132. https://onlinelibrarv.wilev.com/doi/10.1002/app.42130, Retrieved Jul. 25, 2022., pp. 1-17.

INOX Australia Pty Ltd, Water Spray Cooling Tunnels, 2015. Note the Webarchive capture link establishes a latest date of publication of Mar. 9, 2015, https://web.archive.org/web/20150309150516/http://www.inox.com.au/water-sprav-coolingtunnels., Retrieved Apr. 19, 2022., pp. 1-2.

\* cited by examiner

GAS TREATMENT ELEMENT AND A METHOD OF FORMING A GAS TREATMENT ELEMENT

CROSS-REFERENCE TO RELATED PATENT APPLICATIONS

The present application is a U.S. national stage application under 35 U.S.C. § 371 of PCT Application No. PCT/GB2017/051463, filed May 24, 2017, which claims priority to United Kingdom Patent Application No. 1609108.4, filed May 24, 2016. The disclosures of the aforementioned priority applications are incorporated herein by reference in their entireties.

The present invention relates to a gas treatment element and to a method of forming such a gas treatment element. Particularly, but not exclusively, the invention relates to a method of forming an adsorbent element for a compressed air desiccant dryer.

Compressed air is widely used in many industries as a safe and reliable source of power. However, the compressed air delivered from a compressor contains contaminants which must be removed before it can be used. The three main contaminants are dirt, water and lubricating oil from the compressor. The dirt and oil droplets are readily removed by filtration systems which are familiar to a person skilled in the art. The water comes in the form of either a condensate (also referred to as bulk water) or as water vapour. Bulk water is readily removed by the use of storage tanks or water separation devices. Water vapour is removed using drying devices such as refrigerant dryers, membrane dryers and desiccant dryers. Refrigerant dryers typically lower the Pressure Dew Point (PDP) of the air to +10° C. which is suitable for most factory applications. However, lower PDP's can be required particularly for outdoor applications where the ambient temperature falls below freezing. For example, a PDP of −40° C. forms part of the class 1 for water classification in ISO 8573.1.

Desiccant dryers are commonly used to obtain a PDP of −40° C. and are typically formed as a vessel containing a granular desiccant adsorbent which dries the compressed air using a technique familiar to person skilled in the art and known as pressure swing adsorption. The use of such granular adsorbents has a number of disadvantages. For example, the vessels, known as columns, containing the granular desiccant are most effective when oriented vertically and located on a stationary solid base. However, this may not be convenient for some applications. Shock and vibration of the column can lead to degradation of the granular desiccant causing it to form a powder which can contaminate downstream components and varies the parameters of the dryer. The loss of the pressure of the compressed air across the drying apparatus can be significant with granular desiccant dryers and may vary as the granular material becomes degraded. Channelling and bypass, where the flow of compressed air is not evenly distributed across the bed of granular desiccant leading to underperformance of the dryer, are also problems of granular desiccants. These problems are exacerbated when the ambient conditions in which the dryer is working are more arduous, such as working outdoors in varying temperature and humidity and where the apparatus is not stationary and subject to shock and vibration.

These problems are, to a certain extent, addressed in the product disclosed in the International patent application published under the number WO 2007/007051. This document discloses a product in which the adsorbent is formed into tubes typically containing 80% adsorbent crystals and 20% polymer binder. These adsorbent tubes typically have a diameter of 2 mm and a 1 mm bore. The gas to be dried passes through the lumen (bore) where adsorption of the water takes place on the inside of the tube walls. The thin tube walls enable fast adsorption and desorption to take place. In a typical example compressed air at 7-10 bar flows through a dryer at a rate of 300 L per minute (free airflow) and utilises tubular drying whose housing is 44 mm in diameter and which therefore requires around 360 tubes with the spaces between the tubes sealed. By using only the internal bore of the tubes the surface area available for drying requires a higher number of tubes than would otherwise be required. As a result, the surface area utilised in this device is not maximised which particularly becomes a problem for large systems where size can become a constraint to their use.

The device described above eliminates many of the disadvantages of the granular adsorbent technology and in particular enables the drying column to be oriented horizontally which is much preferred in many installations. The tubes of adsorbent material are formed by extrusion where a dope of adsorbent crystals, polymer and solvent are extruded into a waterbath at which point a phase inversion takes place as the solvent dissipates into the water leaving only the adsorbent and polymer support which crystallises bonding to the adsorbent as the polymer is insoluble in water. The polymer support takes no part in the adsorption and desorption processes which enhances the kinetics of these processes. Furthermore, in the event that the tubes become saturated with water condensate (or other bulk water) they are able to fully recover their performance. Granular desiccants are unable to recover from water saturation and typically require replacement every two years whereas the tubular technology described above generally has a 10 year life.

However, although the adsorbent tubes are a significant improvement on the granular desiccant for arduous applications there are some significant disadvantages. Firstly, the process of production of the small tubes is relatively slow making the product expensive. Where a gas treatment element using tubes is positioned horizontally, in order to ensure that the advantages of the tubes not settling and creating a bypass stream of air along the top of the gas treatment element, it is necessary to hold the tubes in place. This is achieved by potting the ends of the tubes with a sealant material and for applications where the tubes are very long it can also be necessary to support the tubes partway along their length. The potting and support of the tubes adds significantly to the construction process and after some use the potting can become cracked causing further problems. Furthermore, the free linear flow of air along the lumen of each tube results in an almost unmeasurably small pressure drop. Although significant loss of pressure during the drying of compressed air is not desirable a close to zero pressure drop can result in uneven flow of air through the drying column which then requires additional components to ensure the flow is even.

One of the disadvantages of the tubes compared to granular desiccant material is the density of adsorbent in a given volume of a drying column. Typically the tubes provide around 70% of the adsorbent available compared to the granular desiccant beads. Furthermore, the method of the present invention allows the thickness of the sheet material as it is cast to be varied and it is also easy to vary the space between the layers for example by varying the tightness with which an element is wound or by changing the embossing pattern. Varying these parameters, as well as the proportions of adsorption material and binder material, means that the characteristics of the element so formed can be easily varied and much more easily than in any of the prior art.

Another form of dryer, which works on a similar principle of regeneration of desiccant but using a different process for enabling the regeneration, is commonly known as a drum dryer. An example of such a dryer is disclosed in U.S. Pat. No. 4,911,775 this example is typical of drum dryer is where a portion, typically a quarter, of the dryer is used to dry a flow of air passing therethrough whilst three quarters of the drum regenerates. The drum slowly rotates to move portions of the drum from the drying to the purging sections. The drums are typically formed from a corrugated support which is treated with a desiccant adsorbent material. Once treated the cardboard is formed into a roll which is the drum. The corrugations in the cardboard form discreet pathways along which the air flows. Because the corrugations are substantially linear pathways they suffer from similar disadvantages to the adsorbent tube used in column dryers described above.

Preferred embodiments of the present invention seek to overcome or alleviate the above described disadvantages of the prior art.

According to an aspect of the present invention there is provided a method of forming a gas treatment element for use in a gas treatment apparatus, comprising the steps:—
forming a sheet material including at least one adsorbent material and at least one binder; and
locating layers of said sheet material adjacent each other to form a gas treatment element.

By creating the gas treatment element by casting a sheet of adsorption material and then layering that sheet material to form the gas treatment element has significant advantages over the prior art. This method has all of the same advantages of the multiple tubes formed from desiccant and polymer binder over traditional granular desiccant binders and has further advantages over the tubes. These further advantages are in two particular areas being firstly the speed and cost of production and secondly the control of the flow of air through the gas treatment element.

The formation of the tubes of the prior art is a slow process (typically 2 m/min) and a very large number of tubes are required to create a single gas treatment element. In contrast the process of creating a sheet material and layering it to create the gas treatment element is much faster allowing many more gas treatment elements to be produced by the method of the present invention in the time needed to produce sufficient tubes to create a single gas treatment element. This clearly has significant savings in costs as well as time.

It is important to note that, in the tubes gas treatment elements of the prior art, increasing the bore of the tubes would enable the gas velocity to be reduced giving the gas more time to contact the adsorbent. However, the density of the adsorbent would fall even further. A potential solution of making the outer diameter of the tubes smaller would increase the adsorbent density a little but would require even more tubes.

One of the problems identified with the tubes of the prior art is the linear and unrestricted flow of the compressed gas down the lumen or bore of each tube. Although significant pressure loss is not desirable a small pressure loss is preferable as it ensures good mixing of the compressed gas as it passes through the treatment element. By varying the space between the layers of the sheet material to form the gas treatment element the spacing between adjacent layers of the sheet material are therefore varied allowing free-flowing or more restriction to the passage of the compressed gas passing through the treatment element as desired.

In a preferred embodiment the locating layers of said sheet material adjacent each other comprises rolling said sheet to form a gas treatment element.

Creating the layers of sheet material by rolling is a particularly quick way to make a robust gas treatment element. The rolling process creates a cylindrical gas treatment element which is easily sized to fit perfectly into a cylindrical housing for use in high pressure gas treatment apparatus such as pressure swing adsorption devices. Furthermore, by rolling the sheet material the handling of the gas treatment element is much reduced. Only the outermost portion of the sheet material once wound can be handled. This reduces the likelihood of damage to the gas treatment surface inside the element which may in turn allows the proportion of polymer binder to desiccant to be reduced. It is also the case that the spiral-shaped cross-section resulting from the rolling of the sheet material allows the compressed gas to dissipate around the spaces between the sheets as it passes along the gas treatment element resulting in greater dissipation of the gas around the element and a more even flow across the whole cross-section of the gas treatment element. This is not possible in the tubes of the prior art as once gas enters a tube it is substantially constrained within the lumen of the tube. This is also in contrast with the flow seen in corrugated drum driers where gas passes linearly along the enclosed passageways created by the corrugations. Furthermore, the laminar flow in the tubes of the prior art results in no possibility for creating turbulence which is desirable for better absorption kinetics.

It is also worth noting that rolling the sheet of adsorbent material preferably occurs concurrently with the casting of the material into a sheet further increasing the efficiency of production. In other words, as soon as the adsorbent is cast into a sheet it is rolled to form the gas treatment element and is almost immediately ready for use.

In another preferred embodiment the locating layers of said sheet material adjacent each other comprises cutting said sheet into said layers and placing said layers on top of each other.

In a further preferred embodiment the sheet material is rolled around a central member.

Rolling the sheet material onto a central member ensures that spacing between layers of the sheets once rolled is substantially the same and reduces the likelihood of a central space being left open through which the gas is more likely to flow.

In a preferred embodiment the sheet material is formed onto a flexible support material.

By forming the sheet material onto a flexible support the advantage is provided that the combination of the two sheet materials can be easily rolled to form the gas treatment element. Furthermore, the support material allows the proportion of binder material used in the creation of the sheet material to be reduced to as little as 10% further increasing the adsorbent density. A further advantage of the use of a flexible support material is that the support material controls the space between the layers of the sheet material as it is rolled. This therefore allows for a greater amount of control in the pressure loss through the gas treatment element and also ensures turbulent flow within the gas treatment element which in turn ensures that all of the gas comes into contact with the adsorbent material in the sheet material. The inclusion of a support material is particularly useful where larger gas treatment elements are being formed.

In another preferred embodiment the flexible support material comprises a non-woven fabric.

Nonwoven fabrics enhance the advantages of the flexible support set out above.

The method may further comprise applying an embossed pattern on at least one surface of said sheet material.

By embossing one or both of the surfaces of the material the advantage is provided that spaces can be created between the layers of the sheet material. This helps to ensure turbulent flow along the spaces between the layers which in turn aids and absorption increases contact time and allows the gas to be passed through the treatment element at a higher velocity.

The method may further comprise inserting said element into a tubular vessel.

A tubular vessel provides protection for the gas treatment element once formed.

In a preferred embodiment the binder comprises at least one polymer.

In another preferred embodiment the adsorbent material comprises at least one desiccant material.

According to another aspect of the present invention there is provided an element for a gas treatment apparatus, the element comprising layers of at least one sheet material including at least one adsorbent material and at least one binder such that spaces between adjacent layers provide pathways for gases passing along said element.

In a preferred embodiment the layers form an element having a substantially spiral-shaped cross-section.

The element may further comprise a central member around which said sheet material is wound.

In another preferred embodiment the layers are substantially planar.

The element may further comprise at least one flexible support material at least partially forming at least one said pathway.

In a preferred embodiment the flexible support material comprises a non-woven fabric.

In another preferred embodiment the sheet material comprises an embossed pattern on at least one surface.

The method may further comprise a tubular vessel for containing said layers of said sheet material.

In a further preferred embodiment the binder comprises at least one polymer.

The adsorbent material preferably further comprises at least one desiccant material.

According to a further aspect of the present invention there is provided a gas treatment apparatus comprising:—
an element as set out above; and
a housing having at least one inlet and at least one outlet, said housing containing said element.

According to another aspect of the present invention there is provided a method of forming a gas treatment element for use in a gas treatment apparatus, comprising the steps:—
forming a sheet material including at least one adsorbent material and at least one binder; and
rolling said sheet to form a gas treatment element.

According to a further aspect of the present invention there is provided an element for a gas treatment apparatus, the element comprising at least one sheet material including at least one adsorbent material and at least one binder and having a substantially spiral-shaped cross-section such that spaces between adjacent layers provide pathways for gases passing along said element.

Preferred embodiments of the present invention will now be described, by way of example only, and not in any limitative sense with reference to the accompanying drawings in which:—

Figure 1:
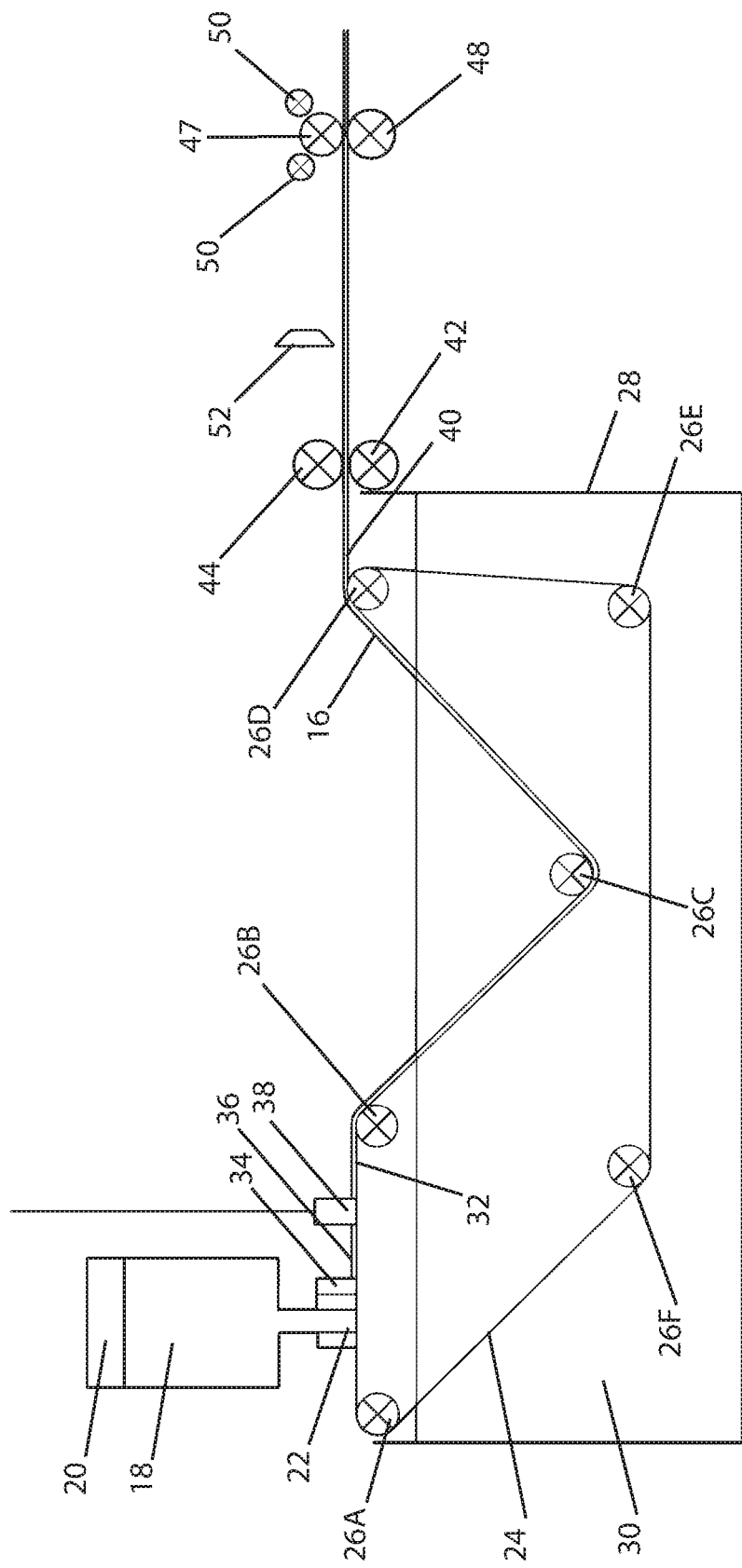
FIG. 1 is a schematic representation of an apparatus used in the formation of a gas treatment element of the present invention.
Figure 4:
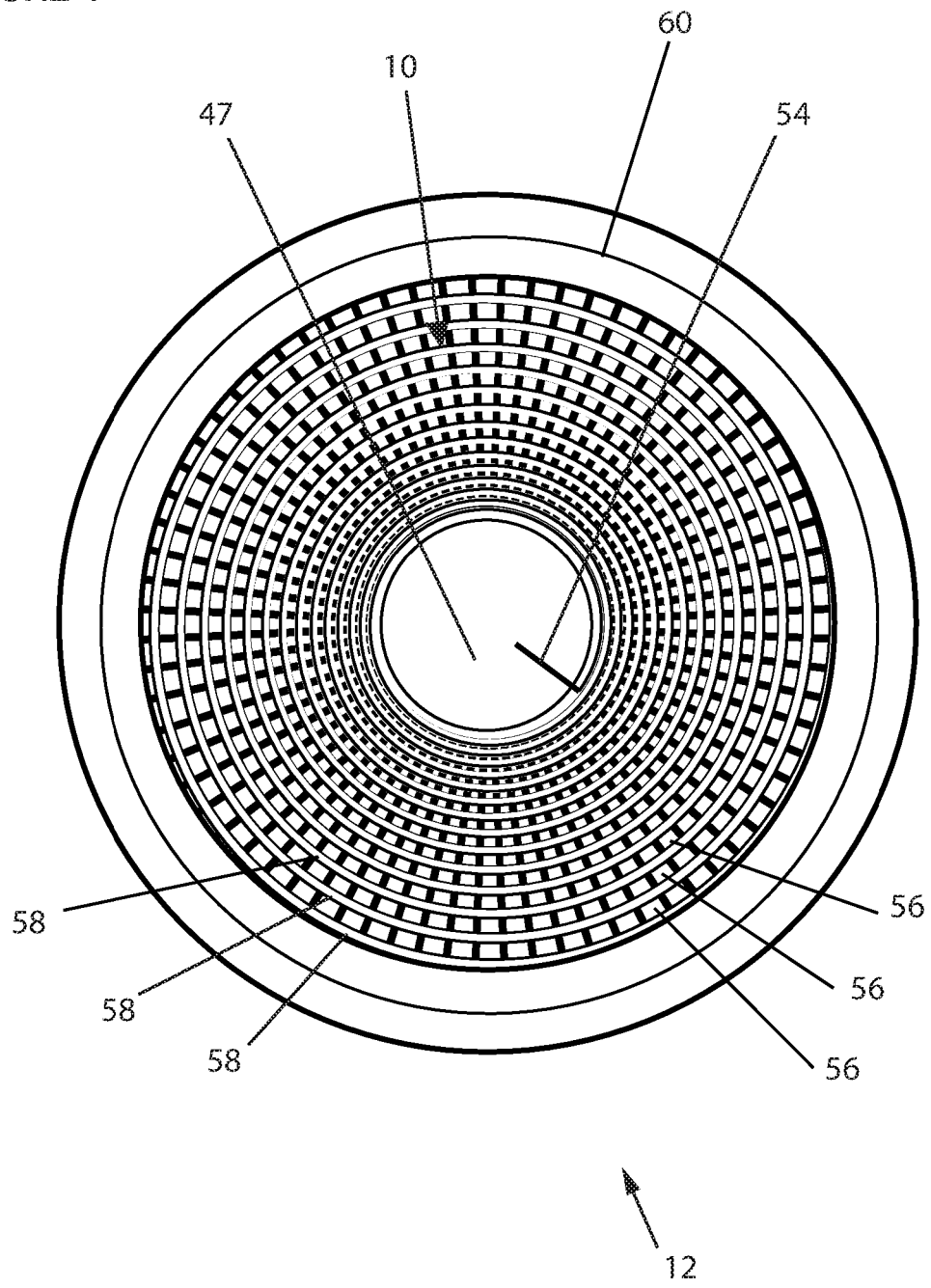
FIG. 4 is an end view of a gas treatment element of the present invention.
Figure 6:
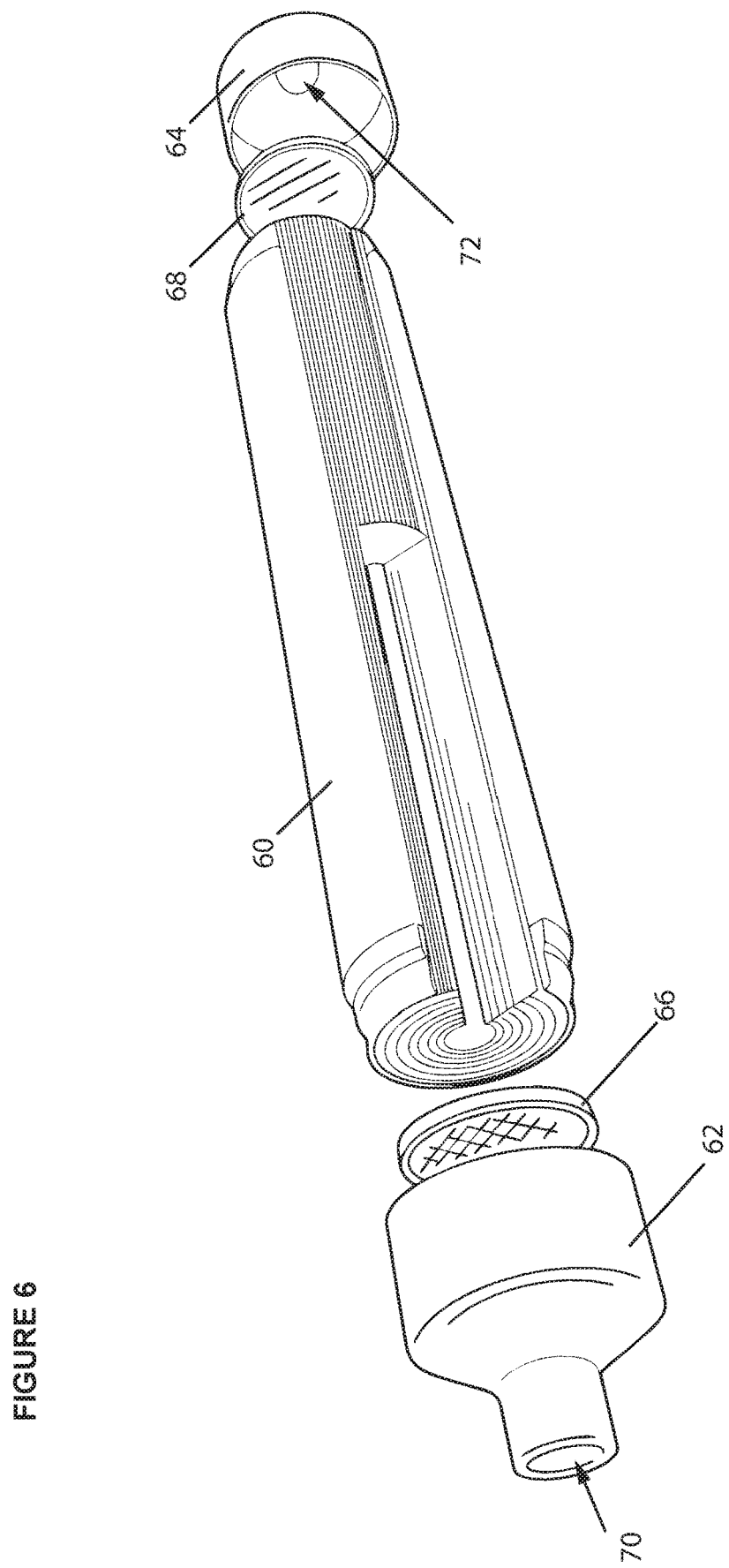
FIG. 6 is a partial sectional perspective view of a gas treatment apparatus of the present invention.
Figure 7:
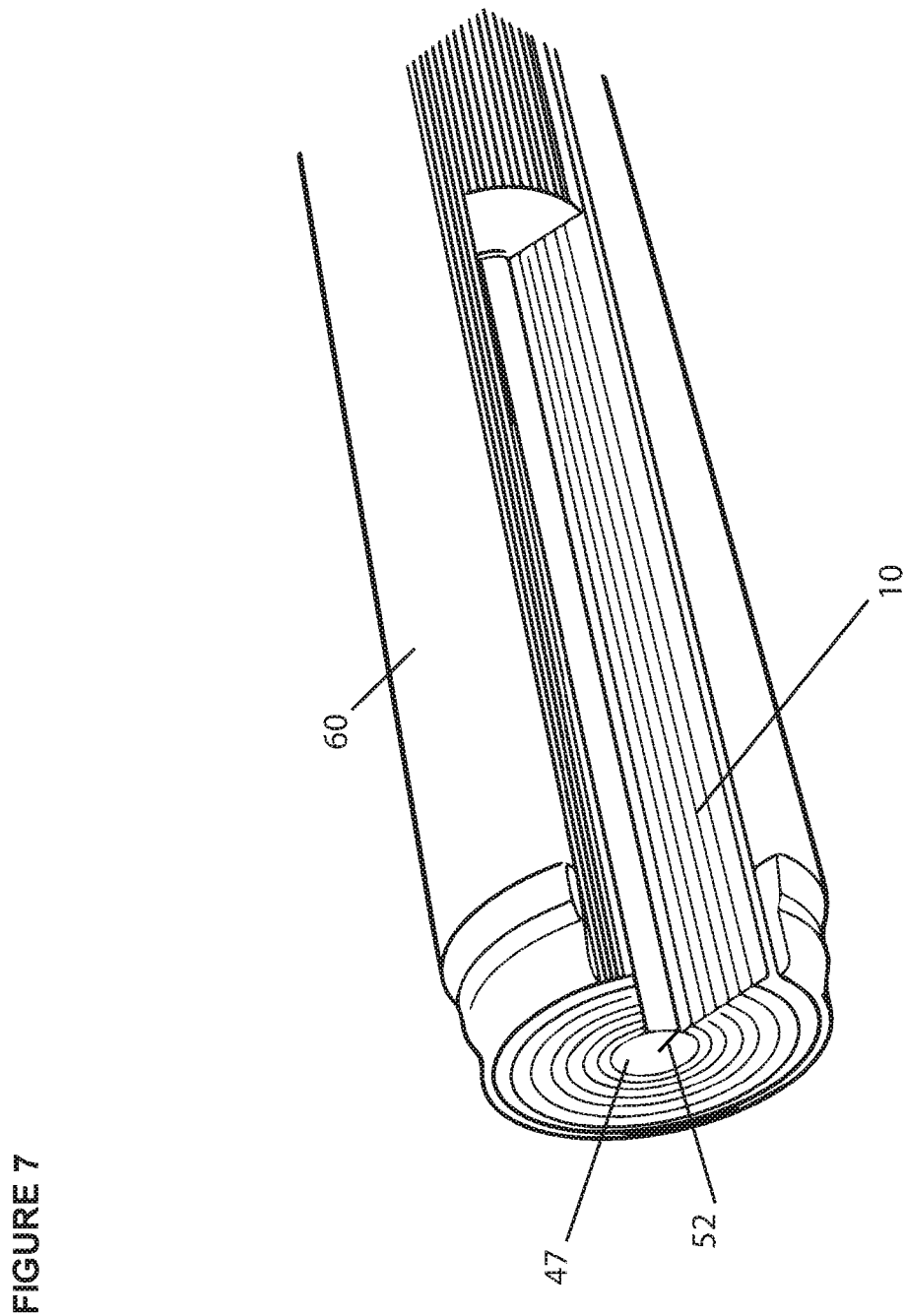
FIG. 7 is a close-up view of a portion of FIG. 6.

Referring initially to FIGS. 1, 4 and 6, a method of forming a gas treatment element 10 for use in a gas treatment apparatus 12 utilises production apparatus 14 shown in FIG. 1. The production of the gas treatment element 10 includes two main steps of forming a sheet material 16 by a process of casting and then rolling the sheet material to form the gas treatment element. The sheet material 16 is initially formed from a dope mixture which includes the adsorbent material, a polymer support and a solvent for the polymer. The dope mixture 18 is held in a reservoir container 20 which has an outlet feed 22 located adjacent, that is immediately above, a continuous belt 24. A series of belt rollers 26 (labelled 26A, 26B, 26C, 26D, 26E and 26F) determine the path of the continuous belt 24 with at least one of the belt rollers (typically roller 26D) being driven causing the belt 24 to rotate in a clockwise direction as viewed in FIG. 1.

The production apparatus 14 includes a waterbath 28 which contains water 30. The path of the continuous belt 24, as determined by the position of the belt rollers 26, passes into and out of the water 30 in bath 28. Immediately below the belt 24, adjacent the outlet feed 22 of the dope reservoir 20, is a support plenum 32 which supports the belt 24 as it passes between the two belt rollers 26 that are closest to the reservoir outlet feed 22. Also adjacent the outlet feed 22 is a doctor blade 34 which is positioned a precise distance above the belt 24. The purpose of the doctor blade 34 is to spread or cast the layer of dope mixture 18, indicated at 36, into a thin film of a predetermined thickness.

Converting this film of liquid dope into a sheet material utilises a phase inversion technique by washing the solvent in the dope mixture 18 from the film of material using water as a further solvent. The adsorbent material is soluble in neither the dope solvent nor the water and the polymer support is soluble in the dope solvent but not in water. The dope solvent is also soluble in water. When water is mixed with the dope mixture the dope solvent is washed out of the dope mixture leaving the adsorbent material and polymer support which immediately solidifies or crystallises and bonds to the adsorbent material. The water is applied from above via a water feed 38 and/or by submersion in the water 30 in waterbath 28. Once the water has been applied the sheet material 16 is formed and is indicated emerging from the water 30 adjacent the belt roller 26D and passes on to a planar surface 40. In this just formed state the sheet material still has significant flexibility and malleability and passes through a pair of rollers 42 and 44 with roller 42 being a drive roller and roller 44 being an embossing roller having a textured outer surface.

Figure 5:
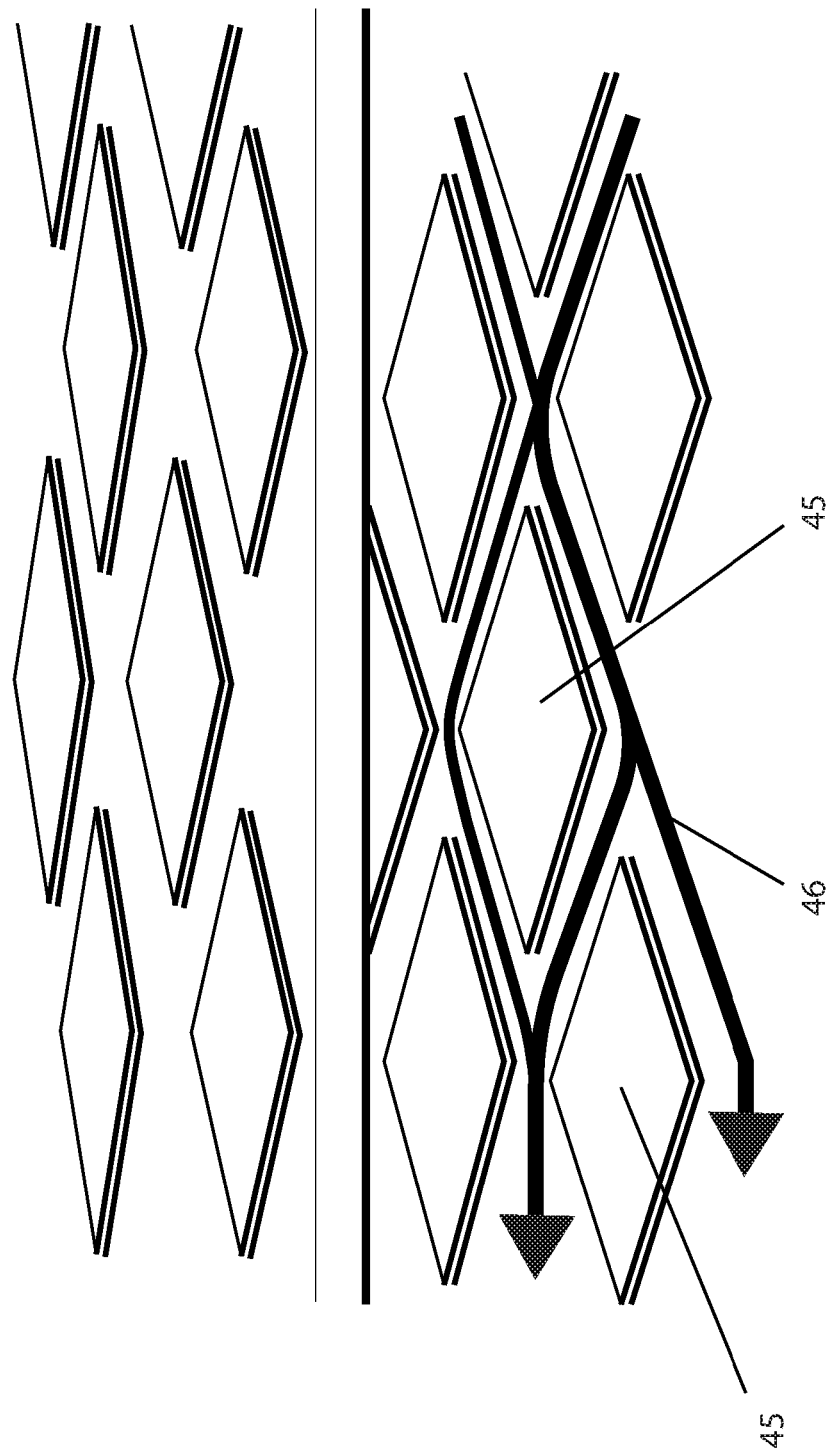
FIG. 5 is a schematic representation of a section of a gas treatment element of the present invention showing the gas pathways.

The embossing roller 44 creates a pattern in the surface of the sheet material which corresponds to its textured outer surface. In the examples shown in FIGS. 4 to 7 this texture is a series of diamond shapes. As illustrated in FIG. 5 the raised (in this case diamond) shapes 45 create channels 46 between them. Ideally the pair of rollers 42 and 44 are both embossed and are a pair of male and female embossing rollers the drives of which are synchronised to produce a matched embossing on the top and bottom surfaces of the sheet material which has a pattern effect but results in no compression of the sheet material.

The next stage of the process is then undertaken by rolling the sheet material 16 to form the gas treatment element 10. A central member in the form of a spindle 47 is driven by a further driven roller 48 (which is synchronised with the other driven rollers 42 and 26D) and this acts as a bobbin around which the sheet material 16 is wound. A pair of floating rollers 50 apply a gentle pressure to the sheet material as it is rolled. The central core member or spindle 47 can be formed from any suitable rod of material including, but not limited to, polymer composites (such as Nylon 6,6 6, 12, Polytetrafluoroethylene PTFE) or metal based and treated metal based rods (such as Aluminium and Stainless steel). The spindle 47 is desirable but not an essential feature and the gas treatment element can be self-wound with a core back filled with adsorbent media to ensure that there is not a larger space in the centre of the element through which air can pass more easily than through the spaces between layers. In a further alternative, the sheet material can be wound around the spindle 47 but not fixed to the spindle. Once sufficient sheet material has been tightly wound around the spindle, the spindle can be removed and replaced with a sealant material such as silicon.

A guillotine type cutter 52 is also provided to cut the sheet material when sufficient has been rolled.

Operation of the production apparatus 14 will now be described. A dope mixture 18 is prepared using the following method. The dope mixture described below is for the production of a desiccant gas treatment element for removing water vapour from compressed air. The production technique described below is for producing benchtop quantities of dope for creating small runs of benchtop production of the gas treatment element.

The dope mixture 18 includes a polymer, adsorbent/active agent and first solvent. The polymer may be selected from the group consisting of but not limited to polyethersulfone (PES), copolyethersulfoneformals (PESF), polysulfone, polyvinyl chloride (PVC), polyvinylidenefluoride (PVDF), polyvinylidene fluoride, polyamide, polypropylene, polyethylene, polyketone, polysiloxane, Epoxy, Cellulose acetate, polymethylmethacrylate, polyimide, poly(ether imide) and polyacrylonitrile. The first solvent may be selected from but not limited to the group consisting of 1-methyl 1-2-pyrrolidone (NM P), N-dimethylformamide (DM F), N, N-dimethylacetamide (DMAc), Dimethylsulfoxide (DMSO), Dichloromethane (DMC), 1,4-Dioxane, Acetone, 4-butyrolactone and Tetrahydrofuran (THF). The adsorbent may be a zeolite for example a high silica zeolite including but not limited to 13X, type 5A, type 4A, type 3A and type XL8.

To create the dope mixture the suitable solvent and the desired quantity of the polymer are combined. The mixture is stirred to form a polymer solution. Upon the polymer solution becoming clear, the desired amount of the active/adsorbent agent powder is slowly added preferably in two stages. The mixture is then stirred thoroughly for up to 24 hours until the powder is dispersed uniformly in the polymer solution. The mixture is then placed on a roller until used, ensuring uniform mixture remains.

Once prepared, the dope mixture 18 is placed into the reservoir 20 and allowed to flow from the outlet feed at a controlled predetermined rate. The movement of the continuous belt 24, resulting from the rotation of the driven belt roller 26D causes the dope mixture 18 to pass under the doctor blade 34 causing it to spread out to form a film 36. The application of a second solvent in the form of water via the water feed 38 and/or by submersion into the water 30 in waterbath 28 causes a phase inversion and the first solvent in the dope mixture 18 washes into the water resulting in the forming of the sheet material 16 which is carried on the belt 24 until the belt passes over the roller 26D and the sheet material engages the planar surface 40. The process for creating this sheet material 16 can be considered a casting process to create an adsorption sheet.

The sheet material 16 continues to pass along the surface 40 and is embossed between the driven roller 42 and the embossing roller 44. A free end of the sheet material 16 is inserted into a slot 52 which is cut radially into the spindle 47 along its length or by other suitable attaching means. This traps and grips the sheet material 16 and the rotation of the spindle 47 by the further driven roller 48 causes the sheet material to begin to form into a role. After sufficient rotations of the spindle to produce the required diameter of gas treatment element 10 the guillotine cutter cuts the sheet material. One of the cut edges forms the outermost end of the element that has just been formed and the other cut edge can be used as the start of the next element by inserting it into the slot 52 in another spindle 48.

Turning to FIGS. 4 to 7, the gas treatment element 10 formed by the method set out above can be seen from FIG. 4 to have a spiral-shaped cross-section with the layers 56 of sheet material 16 separated by interstitial spaces 58. The gas treatment element 10 is placed inside a tubular vessel or housing 60 which is sealed with end caps 62 and 64 with a filter 66 located between the inlet 70 of end cap 62 and the gas treatment element 10 and a further filter 68 located between the gas treatment element and an outlet 72 of end cap 64. As mentioned above the spindle 47 can be removed and replaced with a sealant such as silicone. This is particularly useful to ensure the even distribution of the sheet material through the housing thereby ensuring even flow of gas. This is achieved by winding the sheet material onto the spindle sufficiently tightly and to a size that is only slightly smaller than the internal diameter of the housing. Thus once the grip on the sheet material is released the spiral shape will unwind very slightly expanding to gently press against the inner surface of the housing. This in turn slightly expands the space in the centre of the gas treatment element which is then filled with silicone sealant, or the like, so as to ensure that air does not simply flow down the large central bore.

It should be pointed out that references to the spiral-shaped cross-section of the formed gas treatment element of this invention should not lead to any confusion with spiral wound ultrafiltration membrane systems which are a completely unrelated field of fluid treatment most typically being used on liquids.

Figure 2:
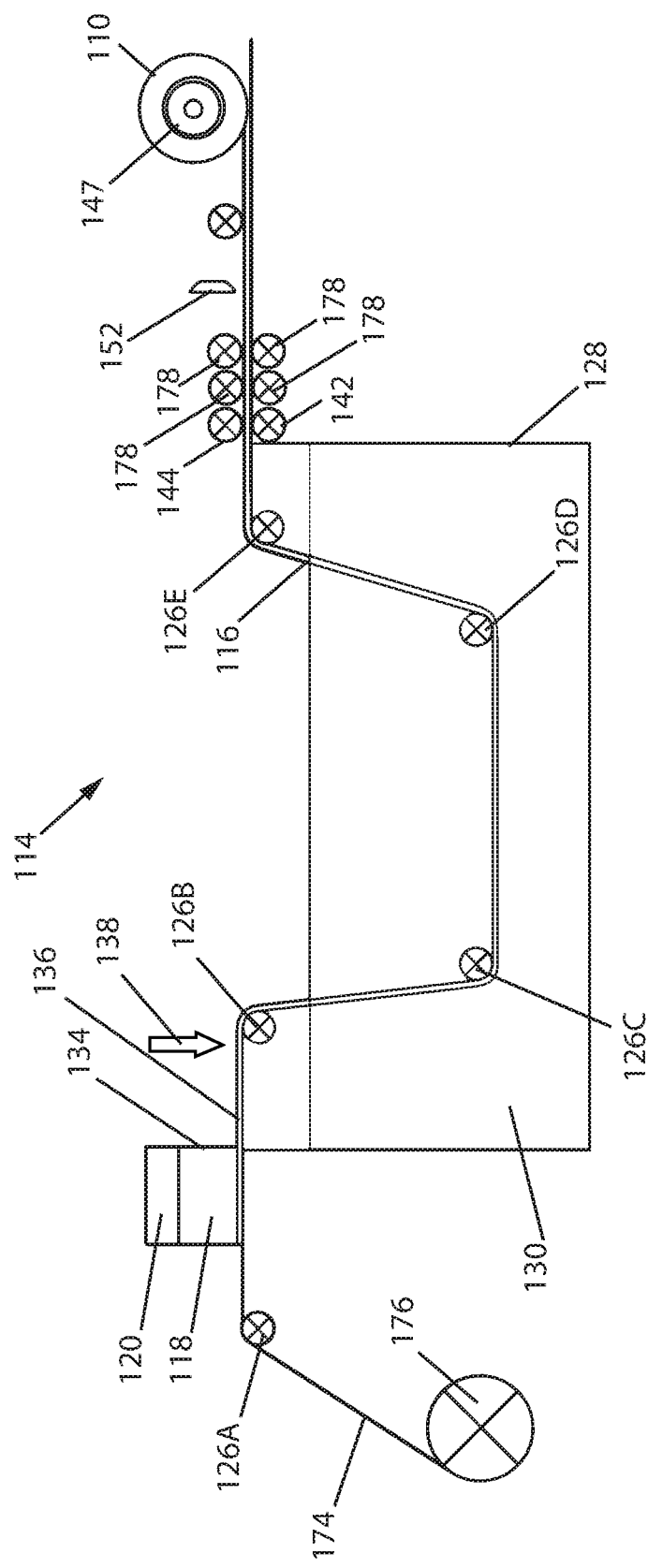
FIG. 2 is a schematic representation of another apparatus used in the formation of another gas treatment element of a different embodiment of the present invention.

Referring to FIG. 2, in which features in common with those shown in FIG. 1 have been labelled with like reference numerals increased by 100, an alternative production apparatus 114 is shown. The most significant difference between the production apparatus 114 and that previously described (and referenced 14) is that the continuous belt 24 has been replaced with a flexible support material in the form of a backing material 174. The adsorbent sheet material 116 is formed onto and adheres to the sheet of backing material 174 which spools from a roll 176. The backing material 174 provides support for the sheet material 116 and allows the compressed gas being treated, when the gas treatment element 110 has been formed and is in use, to pass between the layers of the sheet material. The backing material 174 is preferably a nonwoven fabric. Examples of preferred nonwoven fabric include, but are not limited to, Nylon-based backing materials (such as Cerex®, PBN-II, Orion), Polyester composites (such as Mylar, Melinex®), Polypropylene and Polytetrafluoroethylene PTFE (Teflon) composites. The thickness of the backing material is preferred to be between 10 μm and 500 μm. Furthermore, the backing material 174 can be a film material such as Mylar®. A series of rollers 126 direct the path of the sheet material close to the reservoir 120 of dope mixture 118 and through the water 130 in waterbath 128. A film 136 of dope mixture 118 is created by doctor blade 134 and water is applied via water feed 138 and/or the water 130 in waterbath 128 to create the phase inversion leading to the formation of the sheet material 116 as previously described. An optional in bossing roller 144 is provided with the driven roller 142 as well as further driving rollers 178 which assist in pulling the sheet material 116 and backing material 174. A spindle 147 is used at the centre of the gas treatment element 110 as previously described.

Figure 3:
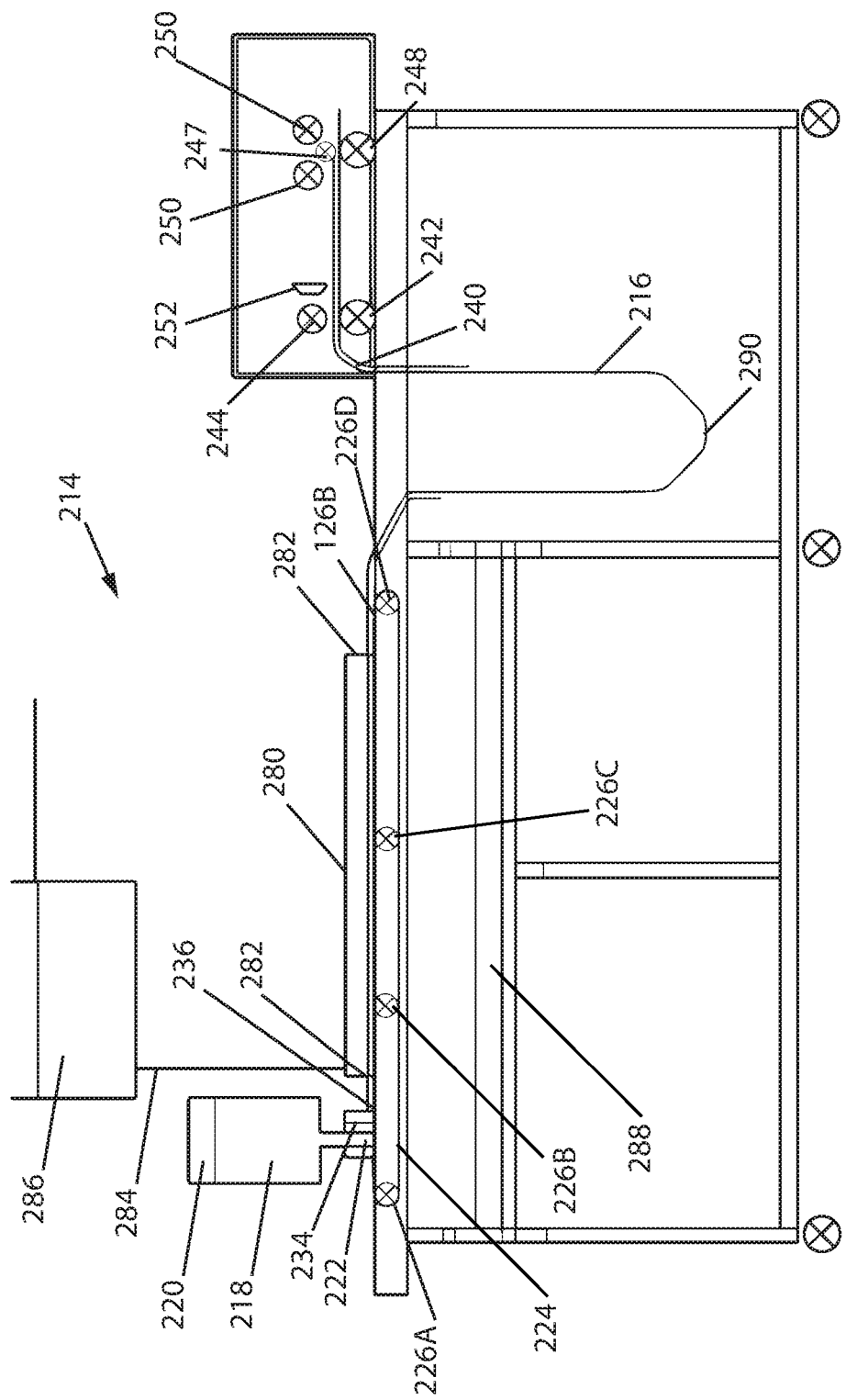
FIG. 3 is a schematic representation of a further apparatus used in the formation of a further gas treatment element of a different embodiment of the present invention.

FIG. 3 shows a further alternative production apparatus 214 which is labelled such that features in common with those shown in FIG. 1 have been identified with like reference numerals increased by 200. In this embodiment the large water bath 28 and 128 has been removed as sufficient water can be applied to create the phase inversion without submerging the sheet material in the bath. Instead of a waterbath a tunnel 280 is provided with openings 282 at either and through which the conveyor 224 can pass. The tunnel 280 is filled with water from a supply pipe 284 which is fed from a supply tank 286 (although the supply tank could be replaced with a feed directly from the water mains). Below the conveyor 224 is a tank 288. In operation, the film 236 of dope material 218 is produced onto conveyor 224 using the doctor blade 234 in the manner previously described with reference to FIG. 1 however, in the embodiment of the invention shown in FIG. 3 the conveyor 224 and film 236 of dope material 218 enters the tunnel 280 through the left-hand opening 282. The tunnel 280 is filled with water from tank 286 via feed 284 with water constantly flowing out of the two openings 282 which are slightly wider than the width of the conveyor and a few millimetres taller than the thickness of the conveyor. The conveyor 224 and tunnel 280 are inclined (left to right as shown in FIG. 3) by about half a degree to promote water to exit from the right hand end opening 282. Water flowing from the left hand opening would interfere with the casting area.

The water flowing from the openings 282 runs into the collecting tank 288 from where it can be disposed. The phase inversion which causes the polymer to bond to the adsorbent material takes place in the tunnel 280 resulting in the solid sheet material 216 passing out of the right-hand opening 282 of tunnel 280. The sheet material 216, when it is initially formed and in particular when it is still wet, is very flexible and a loop 290 of the sheet material 216 can hang down in the gap between the end of the conveyor 224 and the embossing rollers 242 and 244. This loop 290 provides useful slack which ensures there is no problematic tension in the sheet material 216 between the casting of the sheet material 216 on the conveyor 224 and the embossing rollers 242 and 244.

Figure 8:
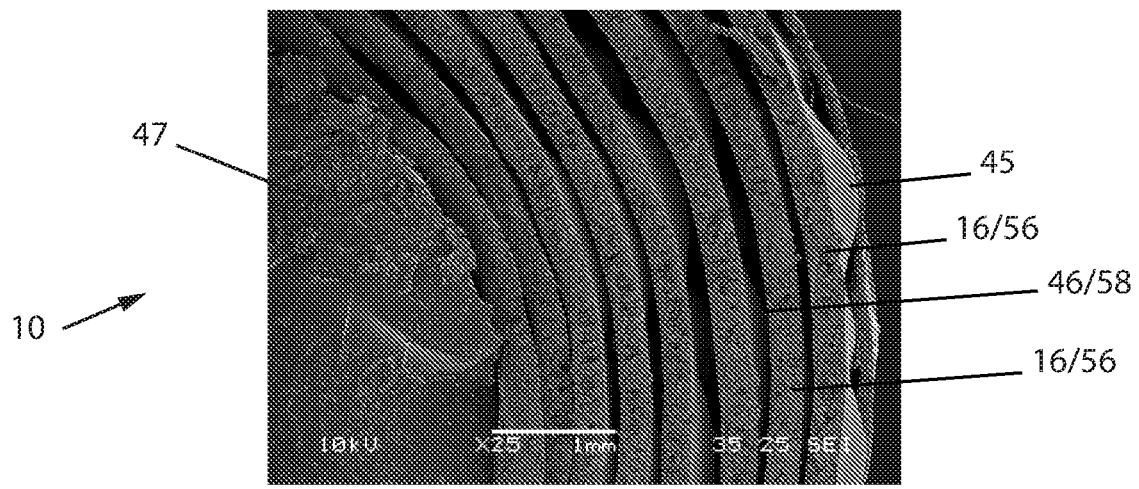
FIGS. 8, 9 and 10 are scanning electron microscope images of a cross-section of an embodiment of the present invention, a closer image of a portion of the embodiment of FIG. 8 and a cross-section of another embodiment of the present invention.
Figure 9:
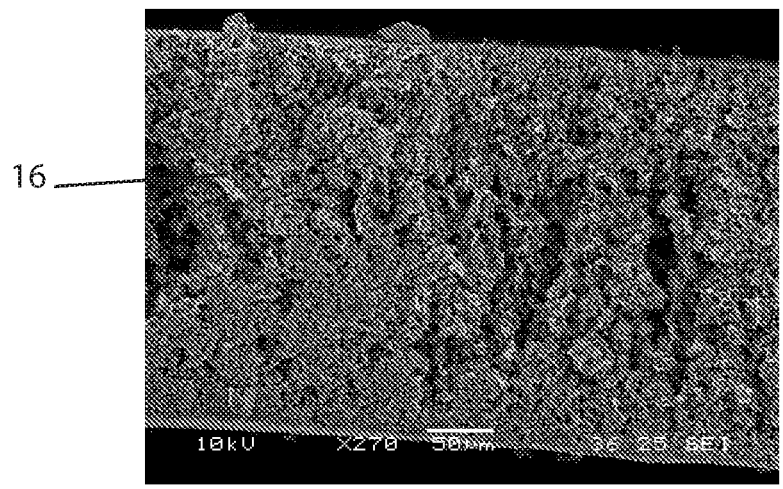

Referring to FIGS. 8 and 9, these images are scanning electron microscope (SEM) images of a portion of a gas treatment element 10 of a cross-section of an embodiment of the present invention and a close-up of a layer of the sheet material 16 of that embodiment. In FIG. 8 the layers of sheet material 16 (or layers 56) can be seen curving around the spindle 47 and creating the gas pathways 46 (or interstitial spaces 58). Furthermore, the raised shapes 45 which help create the gas pathways 46 can also be seen on the outermost layer of the sheet material 16. In the close-up in FIG. 9 the porous structure of the sheet material 16 can be seen. This porous structure results from the production process of casting a film of the doping mixture 18 and the subsequent phase inversion using water to remove the solvent from the dope mixture.

Figure 10:
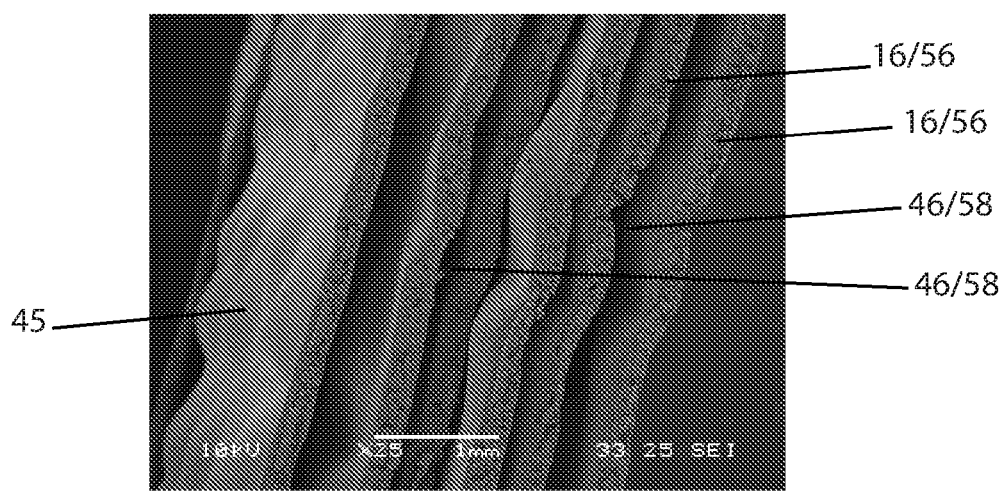

It will be appreciated by persons skilled in the art that the above embodiments have been described by way of example only and not in any limitative sense, and that various alterations and modifications are possible without departure from the scope of the protection which is defined by the appended claims. For example, the above embodiments described the production of a compressed air dryer. However, the same method can be used to produce other gas treatment elements including, but not limited to, Oxygen Generators, Oxygen Purification, Carbon Dioxide removal, Carbon Monoxide removal, Hydrogen Purification, Gas drying, Natural Gas Purification and Catalytic Support Media. Furthermore, the take-up rolling mechanism including the spindle could be submerged. In a further alternative the method of creating the layers of sheet material can be varied by cutting the sheet material into identically shaped sheet members, typically rectangular, and stacking the sheet members one on top of another. An example of this is shown in the SEM image in FIG. 10 which shows the flat sheets of adsorbent material laid next to each other thereby creating the passages 46 through which the compressed gas can pass. FIG. 10 also shows the embossed shapes 45 formed on the surface of the sheet material 16 and which are triangular in the example shown in that figure. The stack of sheet members 16 is then placed into a housing which is sized so that the stack of sheet members fits snugly into the housing and causes the sheet members to gently press against one another. Such a housing will typically have a rectangular cross-section making it less suitable than a circular cross section housing for operating with compressed gases at high pressure. As a result, this embodiment of the invention is suitable for lower pressure drying apparatus. In another variation in the method of production, the sheet material 16 is allowed to soak once formed by either increasing the time it is retained in the waterbath or by transferring to an alternative vessel containing water. Soaking can be for minutes, hours or days and once soaked the sheet material is passed through the rollers to apply the embossing pattern.

The invention claimed is:
1. A method of forming a pressure swing adsorption gas treatment element for use in a pressure swing adsorption gas treatment apparatus, comprising the steps:
mixing at least one adsorbent material, at least one binder, and at least one first solvent to form a dope mixture;

applying a film of said dope mixture to an inclined surface;

forming a sheet material from the dope mixture, the forming step comprising application of flow of a second solvent via a feed of said second solvent to said film of the dope mixture on said inclined surface;

rolling said sheet to form a pressure swing adsorption gas treatment element; and inserting said pressure swing adsorption gas treatment element into a tubular vessel having at least one inlet and at least one outlet.

2. A method according claim 1, wherein said sheet material is rolled around a central member.

3. A method according to claim 1, further comprising applying an embossed pattern on at least one surface of said sheet material.

4. A method according to claim 1, wherein said gas treatment element is substantially cylindrical.

5. A method according to claim 1, wherein said sheet material is formed onto a flexible support material.

6. A method according to claim 5, wherein said flexible support material comprises a non-woven fabric.

7. A method according to claim 1, wherein said binder comprises at least one polymer.

8. A method according to claim 1, wherein said adsorbent material comprises at least one desiccant material.

* * * * *